2,986,553
POLYURETHANE CHELATES FROM KOJIC ACID

Charles R. McCulloch, Sacramento, Calif., assignor to The B. F. Goodrich Company, New York, N.Y., a corporation of New York
No Drawing. Filed June 25, 1959, Ser. No. 822,725
16 Claims. (Cl. 260—75)

This invention relates to chelated polyurethanes and more particularly pertains to kojic acid terminated polyurethane prepolymers, their metal chelate chain extended elastomeric and putty-like compositions and to methods for preparing same.

Numerous attempts have been made in the past to prepare elastomeric and plastic materials by chain extension of low molecular weight polymers containing end groups capable of forming complexes with polyvalent metal ions. The end groups employed in the past have not been entirely satisfactory for this purpose and few, if any, truly useful chelate chain extended polymers have been found.

It is, therefore, an object of this invention to provide novel and useful elastomeric and putty-like polymeric compositions. Another object is the provision of polymeric compositions which are unusually inert to attack by most chemicals. Another object is the provision of new polymeric compositions having extremely limited solubility in most solvents. Still another object is the provision of new polymeric compositions which adhere well to most surfaces. Another object is the provision of polymeric compositions which can be cured by air drying or baking to inert, insoluble materials. Another object is the provision of electrically conducting polymeric compositions. Another object is the provision of a method for preparing these novel polymeric compositions.

The accomplishment of these and other objects will become apparent from the following description and examples, it being understood that numerous changes and modifications can be made by one skilled in the art without departing from the spirit and scope of this invention.

I have discovered a novel polymeric composition comprising the polyvalent metal chelate of a kojic acid terminated polyurethane.

The polyurethanes useful in the present invention are those which result from the reaction of molar quantities of polymeric glycols with double molar quantities of diisocyanates. The polymeric glycols which are most useful in this invention are the polyether glycols, polyester glycols and the polyesteramide glycols. Preferred are the polyester glycols and the polyether glycols.

The polyester glycols are those hydroxyl terminated polymeric materials which result from the esterification-condensation of a dicarboxylic acid or its anhydride with an excess of a glycol. More specifically the polyester glycols are those which are prepared by the esterification-condensation of at least one type of dicarboxylic acid or its anhydride conforming to the structure

HOOC—R—COOH wherein R represents a divalent hydrocarbon radical having from 1 to 12 carbon atoms. Representative acids of this class include malonic, succinic, glutaric, adipic, pimelic, sebacic, suberic, azelaic, maleic, itaconic, phthalic, terephthalic, isophthalic and the like with a glycol conforming to the structure HO—$R_1$—OH wherein $R_1$ is a divalent hydrocarbon radical having from 2 to 12 carbon atoms, such glycols include ethylene glycol, propylene glycol, trimethylene glycol, tetramethylene glycol, butenediol, butynediol, pentamethylene glycol, hexamethylene glycol, cyclohexylene glycol, heptamethylene glycol, octamethylene glycol, o-, m-, and p-xylylene glycols and the like and others. The preferred polyesters for the purpose of this invention are those which result from the condensation of adipic, sebacic, and phthalic acid with alkylene glycols such as ethylene glycol, propylene glycol, trimethylene glycol, tetramethylene glycol and neopentylene glycol.

The polyether glycols useful in this invention are those which are derived from alkylene oxides, glycols, or from heterocyclic ethers and they may be represented by the formula HO($R_2$O)$_n$H in which $R_2$ is an alkylene radical having from 2 to 12 carbon atoms and $n$ is a number greater than 1. As is true in the case of the polyesters, it is not necessary that all of the alkylene radicals be the same in a given polymer and polyether glycols containing a mixture of radicals may be employed. Also useful are polyarylene ether glycols in which $R_2$ alone is an arylene radical and polyarylene-alkylene ether glycols such as polyethylene-phenylene ether glycol or mixtures thereof with polyalkylene ether glycols. The preferred polyether glycols are the polyethylene glycols, the polypropylene glycols and the polybutylene glycols.

The molecular weights of the polyester glycols and polyether glycols embodied in this invention can vary from 150 to 10,000 with the preferred range having the limits of 400 to 4,000. The acid numbers of the polyester glycols embodied in this invention are always less than 10 and preferably less than 4.

The diisocyanates which are most useful in this invention are those which conform to the structure OCN—$R_3$—NCO wherein $R_3$ is a divalent hydrocarbon radical having from 2 to 14 carbon atoms. The preferred diisocyanates are the aromatic diisocyanates such as 2,4-tolylene diisocyanate, 2,6-tolylene diisocyanate, mixtures of 2,4- and 2,6-tolylene diisocyanates, o-, m-, and p-phenylene diisocyanates, naphthalene-1,5-diisocyanate, diphenylmethane-p,p'-diisocyanate and mixtures thereof and the like.

The polyvalent metals useful for forming the polyurethane chelates of this invention include the metals in groups II and III of the periodic table. The most preferred polyvalent metals are copper, iron, aluminum, beryllium and nickel.

Kojic acid is most preferred for termination of the polyurethanes of this invention, however, it is to be understood that other active alpha-hydroxy ketone containing compounds which also contain an aliphatic primary hydroxyl group for reaction with an isocyanate group in the polyurethane can be employed.

The compositions embodied in this invention are preferably prepared by reacting one mole of a substantially anhydrous polyester glycol or polyether glycol with about two moles of a diisocyanate at a temperature of from about 25° C. to about 150° C. in the absence of moisture. The resulting isocyanate terminated polyurethane is then reacted with about 2 moles of kojic acid at from about 25° C. to about 150° C. and more preferably at about 100° C. The product may be neutralized with a monovalent metal base and the resulting salt or kojic acid terminated polymer treated with an equivalent amount of the salt of a polyvalent metal thus causing chain extension and the formation of a high polymer chelate.

The rubbery and putty-like polyurethane chelates embodied in this invention are useful as polymeric conductors, elastomers in applications requiring solvent resistance, as sealants and caulking compounds for marine vessels, fuel tanks and containers, building structures, and as coating agents for metals, wood, plastic articles and the like.

The following examples will illustrate representative specific embodiments of my invention.

*Example I*

A sample of 101.22 g. (0.105 mole) of hydroxyl-terminated polytetramethylene adipate having an average molecular weight of 964 was liquified in a 2 liter glass flask equipped with a mechanical stirrer, a thermometer and a vacuum take-off head and 0.1 ml. of ethyl cyanoacetate was mixed into the polyester. The resulting mixture was dried for about 15 minutes at 100° C. and 5 mm. with stirring. Then, at the same temperature 33.825 g. (0.211 mole) of m-phenylene diisocyanate were added to the reaction mixture and the resulting exothermic reaction caused the temperature to rise to 120° C. After the addition of the diisocyanate, heating and stirring were continued for an hour. 200 ml. of distilled, dry dioxane were than added to the reaction mixture. A hot solution of 30 g. of kojic acid in 200 ml. of dioxane was added to the mixture and the reaction was allowed to proceed at reflux for 4 hours. The product was diluted with an additional 200 ml. of dioxane and 20% aqueous sodium hydroxide was used to neutralize the kojic acid terminated polymer. An aqueous solution of copper acetate next was added slowly to the stirred reaction mixture and the copper chelate polymer product precipitated from the solution as it formed. The product was washed thoroughly with water and was then dried. A yield of 246 g. of dry polymer was obtained. The copper chelate polymer of this example was soluble in tetrahydrofuran and it was found to have an electrical resistivity of $4.2 \times 10^{-7}$ ohms/cm. The putty-like product adhered well to metal, wood and glass surfaces and became hardened upon prolonged standing in the air at room temperature.

The substitution of other hydroxyl terminated polyesters of the types disclosed herein for hydroxyl terminated polytetramethylene adipate and other diisocyanates disclosed herein for m-phenylene diisocyanate gave comparable products.

*Example II*

A prepolymer was prepared by reacting in a mole ratio of 1:1.5 a polytetramethylene oxide glycol having a molecular weight of about 3,000 and p-phenylene diisocyanate, respectively. A mixture of 220 g. (0.1 mole) of this prepolymer and 28.2 g. (0.2 mole) of kojic acid was stirred at 120° C. for 4 hours. The resulting product was cooled and dissolved in 800 ml. of dry, distilled dioxane and the resulting solution was passed through a filter to remove extraneous solid material. A 50 ml. portion of the amber filtrate was diluted with 150 ml. of dry, distilled dioxane and the resulting solution was neutralized with 1.4 ml. of 1.0 N aqueous sodium hydroxide. To the neutralized mixture were added 10 ml. of a 10% aqueous solution of cupric acetate. The reaction mixture separated into two phases. At this point the upper green colored layer was isolated and washed with fresh water. A green crumb which was subsequently dried resulted from this procedure. The resilient rubbery polymeric product could be milled with ease and was soluble in dioxane, tetrahydrofuran and methyl ethyl ketone. The chelate polymer was found by osmometry to have a molecular weight of about 30,000. The chelate polymer was cured with 1% benzoyl peroxide to give an elastomeric product having a tensile of 850 p.s.i. at 20% elongation and exhibiting virtually no cold flow.

A repeat of the above procedure using ferrous ammonium sulfate in place of cupric acetate gave a rubbery polymeric product which was soluble in dioxane and had a room temperature tensile of 1400 p.s.i. at 175% elongation.

The substitution of other polyether glycols disclosed herein for polytetramethylene oxide glycol and other diisocyanates disclosed herein for p-phenylene diisocyanate gave comparable products.

I claim:

1. The composition comprising the reaction product of one mole of (1) a polymeric glycol selected from the class consisting of polyester glycols resulting from the esterification-condensation of a compound conforming to the structure HOOC—R—COOH wherein R represents a divalent hydrocarbon radical having from 1 to 12 carbon atoms and a compound conforming to the structure HO—$R_1$—OH wherein $R_1$ is a divalent hydrocarbon radical having from 2 to 12 carbon atoms, the polyether glycols conforming to the structure HO$(R_2O)_nH$ wherein $R_2$ is an alkylene radical having from 2 to 12 carbon atoms and $n$ is a number greater than 1, (2) about 2 moles of a diisocyanate and (3) about 2 moles of kojic acid at a reaction temperature of from about 25° C. to about 150° C.

2. The composition comprising the reaction product of (A) the reaction product of one mole of (1) a polymeric glycol selected from the class consisting of polyester glycols resulting from the esterification-condensation of a compound conforming to the structure $$HO(R_2O)_nH$$

wherein R represents a divalent hydrocarbon radical having from 1 to 12 carbon atoms and a compound conforming to the structure HO—$R_1$—OH where $R_1$ is a divalent hydrocarbon radical having from 2 to 12 carbon atoms, and polyether glycols conforming to the structure $$HO—(R_2O)_nH$$

wherein $R_2$ is an alkylene radical having from 2 to 12 carbon atoms and $n$ is a number greater than 1, (2) about 2 moles of a diisocyanate and (3) about 2 moles of kojic acid at a reaction temperature of from about 25° C. to about 150° C. and (B) an equivalent amount based on the number of equivalents of kojic acid in (A) of a salt of a polyvalent metal selected from the group consisting of copper, iron, aluminum, beryllium and nickel.

3. The composition comprising the reaction product of (1) one mole of a polymeric glycol selected from the class consisting of polyester glycols resulting from the esterification-condensation of a compound conforming to the structure HOOC—R—COOH wherein R represents a divalent hydrocarbon radical having from 1 to 12 carbon atoms and a compound conforming to the structure HO—$R_1$—OH wherein $R_1$ is a divalent hydrocarbon radical having from 2 to 12 carbon atoms, and polyether glycols conforming to the structure $$HO(R_2O)_nH$$

wherein $R_2$ is an alkylene radical having from 2 to 12 carbon atoms and $n$ is a number greater than 1, (2) about two moles of a diisocyanate conforming to the structure OCN—$R_3$—NCO wherein $R_3$ is a divalent hydrocarbon radical having from 2 to 14 carbon atoms and (3) about two moles of kojic acid at a reaction temperature of from about 25° C. to about 150° C.

4. The composition comprising the reaction product of (1) one mole of a polymeric glycol having a molecular weight of from 150 to 10,000 selected from the class consisting of polyester glycols resulting from the esterification-condensation of a compound conforming to the structure HOOC—R—COOH wherein R represents a divalent hydrocarbon radical having from 1 to 12 carbon atoms and a compound conforming to the structure HO—$R_1$—OH wherein $R_1$ is a divalent hydrocarbon radical having from 2 to 12 carbon atoms, and polyether glycols conforming to the structure HO—$(R_2O)_nH$ wherein $R_2$ is an alkylene radical having from 2 to 12 carbon atoms and $n$ is a number greater than 1, (2) about two moles of a diisocyanate conforming to the structure OCN—$R_3$—NCO wherein $R_3$ is a divalent hydrocarbon radical having from 2 to 14 carbon atoms, (3) about 2 moles of kojic acid at a reaction temperature of from about 25° C. to about 150° C. and (4) an equivalent amount of a water soluble salt of a polyvalent metal selected from the group consisting of copper, iron, aluminum, beryllium and nickel.

5. The composition of claim 4 wherein R is an alkylene group.

6. The composition of claim 4 wherein $R_1$ is an alkylene group.

7. The composition of claim 4 wherein $R_3$ is an arylene group.

8. The reaction product of (1) one mole of an hydroxyl terminated polytetramethylene adipate having a molecular weight of from 400 to 4,000, (2) about two moles of m-phenylene diisocyanate and 2 moles of kojic acid at a reaction temperature of from about 25° C. to about 150° C.

9. The reaction product of the composition of claim 8 and an equivalent amount of copper acetate.

10. The reaction product of (1) one mole of an hydroxyl terminated polytetramethylene oxide glycol having a molecular weight of from 400 to 4,000, (2) about two moles of p-phenylene diisocyanate and (3) about two moles of kojic acid at a reaction temperature of from about 25° C. to about 150° C.

11. The reaction product of the composition of claim 10 and an equivalent amount of cupric acetate.

12. The reaction product of (1) one mole of an hydroxyl terminated polytetramethylene oxide glycol having a molecular weight of from 400 to 4,000, (2) about two moles of p-phenylene diisocyanate and (3) about two moles of kojic acid at a reaction temperature of from about 25° C. to about 150° C.

13. The reaction product of the composition of claim 12 and an equivalent amount of ferrous ammonium sulfate.

14. The method for preparing a kojic acid terminated polymer comprising reacting one mole of (1) a polymeric glycol selected from the class consisting of polyester glycols resulting from the esterification-condensation of a compound conforming to the structure HOOC—R—COOH wherein R represents a divalent hydrocarbon radical having from 1 to 12 carbon atoms and a compound conforming to the structure HO—$R_1$—OH wherein $R_1$ is a divalent hydrocarbon radical having 2 to 12 carbon atoms, and polyether glycols conforming to the structure HO—$(R_2O)_nH$ wherein $R_2$ is an alkylene radical having from 2 to 12 carbon atoms and $n$ is a number greater than 1, (2) about 2 moles of a diisocyanate conforming to the structure OCN—$R_3$—NCO wherein $R_3$ is a divalent hydrocarbon radical having from 2 to 14 carbon atoms and (3) about 2 moles of kojic acid at a reaction temperature of from about 25° C. to about 150° C.

15. The method of preparing a polyurethane chelate comprising reacting at from 25° to 150° C. (1) one mole of a polymeric glycol having a molecular weight of from 150 to 10,000 selected from the class consisting of polyester glycols resulting from the esterification-condensation of a compound conforming to the structure HOOC—R—COOH wherein R represents a divalent hydrocarbon radical having from 1 to 12 carbon atoms, and a compound conforming to the structure HO—$R_1$—OH wherein $R_1$ is a divalent hydrocarbon radical having from 2 to 12 carbon atoms, and polyether glycols conforming to the structure HO—$(R_2O)_nH$ wherein $R_2$ is an alkylene radical having from 2 to 12 carbon atoms and $n$ is a whole number greater than 1, (2) about two moles of a diisocyanate conforming to the structure OCN—$R_3$—NCO wherein $R_3$ is a divalent hydrocarbon radical having from 2 to 14 carbon atoms and (3) about 2 moles of kojic acid and then reacting the product with an equivalent amount of a water soluble salt of a polyvalent metal selected from the group consisting of copper, iron and nickel.

16. The method for preparing a chelate polymer comprising reacting (A) the reaction product of one mole of (1) a polymeric glycol selected from the class consisting of polyester glycols resulting from the esterification-condensation of a compound conforming to the structure HOOC—R—COOH wherein R represents a divalent hydrocarbon radical having from 1 to 12 carbon atoms and a compound conforming to the structure HO—$R_1$—OH wherein $R_1$ is a divalent hydrocarbon radical having from 2 to 12 carbon atoms, and polyethylene glycols conforming to the structure HO—$(R_2O)_nH$ wherein $R_2$ is an alkylene radical having from 2 to 12 carbon atoms and $n$ is a number greater than 1, (2) about 2 moles of a diisocyanate and (3) about 2 moles of kojic acid at a reaction temperature of from about 25° C. to about 150° C. with (B) an equivalent amount based on the number of equivalents of kojic acid in (A) of a salt of a polyvalent metal selected from the group consisting of copper, iron, aluminum beryllium and nickel.

No references cited.

UNITED STATES PATENT OFFICE

CERTIFICATE OF CORRECTION

Patent No. 2,986,553                            May 30, 1961

Charles R. McCulloch

It is hereby certified that error appears in the above numbered patent requiring correction and that the said Letters Patent should read as corrected below.

Column 4, line 24, for "$HO(R_2O)_nH$" read -- $HOOC-R-COOH$ --; line 28, for "where" read -- wherein --; column 5, line 17, after "and" insert -- about --; line 48, after "having" insert -- from --; column 6, line 48, after "aluminum" insert a comma.

Signed and sealed this 12th day of June 1962.

(SEAL)
Attest:

ERNEST W. SWIDER
Attesting Officer

DAVID L. LADD
Commissioner of Patents